(12) United States Patent
Karasawa et al.

(10) Patent No.: US 7,557,984 B2
(45) Date of Patent: Jul. 7, 2009

(54) ELECTROPHORETIC DISPLAY DEVICE AND ELECTRONIC APPARATUS

(75) Inventors: Junichi Karasawa, Shimosuwa-machi (JP); Masayoshi Todorokihara, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/107,480

(22) Filed: Apr. 22, 2008

(65) Prior Publication Data

US 2008/0316578 A1 Dec. 25, 2008

(30) Foreign Application Priority Data

Apr. 24, 2007 (JP) .............................. 2007-114385

(51) Int. Cl.
- G02B 26/00 (2006.01)
- G09G 3/34 (2006.01)
- G03G 13/00 (2006.01)

(52) U.S. Cl. ........................ 359/296; 345/107; 430/31

(58) Field of Classification Search ................ 359/259, 359/296; 345/84–85, 107; 430/31–38; 347/111–112; 399/131; 200/600

See application file for complete search history.

(56) References Cited

U.S. PATENT DOCUMENTS 6,724,520 B2 *  4/2004  Kawai .................... 359/296

FOREIGN PATENT DOCUMENTS

| JP | U-03-067384 | 7/1991 |
| JP | A-2002-196373 | 7/2002 |
| JP | A-2005-241916 | 9/2005 |

* cited by examiner

Primary Examiner—Scott J Sugarman
Assistant Examiner—Dawayne A Pinkney
(74) Attorney, Agent, or Firm—Oliff & Berridge, PLC

(57) ABSTRACT

An electrophoretic display device, includes: an electrophoretic capacitor provided with an electrophoretic layer containing at least one kind of electrophoretic particle; and a ferroelectric capacitor provided with a ferroelectric layer containing a ferroelectric material. In the electrophoretic display device, the electrophoretic particle is allowed to move to conduct a display and thus a polarity of the ferroelectric layer is inverted by a current supply to the electrophoretic capacitor and the ferroelectric capacitor that are electrically connected with each other, and the display can be retained due to a remanent polarization of the ferroelectric layer even after the current supply is stopped. In the device, a formula (A) and a formula (B) are satisfied when a voltage to be applied to the ferroelectric capacitor is $V_f$, a charge stored in the ferroelectric capacitor when the voltage $V_f$ is applied to the ferroelectric capacitor is $Q_f$, a relative dielectric constant of the ferroelectric material is $\in_f$, an area of the ferroelectric layer in a planar view is $S_f$, a thickness of the ferroelectric layer is $d_f$, a relative dielectric constant of the electrophoretic layer is $\in_{EPD}$, an area of the electrophoretic layer in a planar view is $S_{EPD}$, and a thickness of the electrophoretic layer is $d_{EPD}$:

$$\in_o \cdot \in_{EPD} \cdot S_{EPD} \cdot V / d_{EPD} > P_r \cdot S_f + \in_o \cdot \in_f \cdot S_f \cdot E_c +$$
$$\in_o \cdot \in_{EPD} \cdot S_{EPD} / d_{EPD} \cdot E_c \cdot d_f \quad (A),$$

$$P_r \cdot S_f < \in_o \cdot \in_f \cdot S_f \cdot E_c + \in_o \cdot \in_{EPD} \cdot S_{EPD} / d_{EPD} \cdot E_c \cdot d_f \quad (B).$$

6 Claims, 7 Drawing Sheets

ELECTROPHORETIC DISPLAY DEVICE AND ELECTRONIC APPARATUS

The entire disclosure of Japanese Patent Application No. 2007-114385, filed Apr. 24, 2007 is expressly incorporated by reference herein.

BACKGROUND

1. Technical Field

The present invention relates to an electrophoretic display device and an electronic apparatus.

2. Related Art

It is generally known that if an electric field is applied to a dispersal system in which fine particles are dispersed in a liquid, fine particles move (migrate) in the liquid by a coulomb power. This phenomenon is called electrophoresis. Recently, an electrophoretic display device that can display desired information (image) by using this electrophoresis has attracted attention as a new display device.

The electrophoretic display device has characteristics such as a display memory in a state that a voltage application is stopped, a wide viewing angle, and an ability of high-contrast display in low power consumption.

As disclosed in JP-A-2002-196373, an electrophoretic display device in which an electrophoretic capacitor and a ferroelectric capacitor are electrically connected in series has been known in related art. The electrophoretic capacitor is provided with an electrophoretic dispersion liquid layer (electrophoretic layer) that includes an electrophoretic dispersion liquid containing electrophoretic particles. The ferroelectric capacitor is provided with a ferroelectric layer that is primarily made of a ferroelectric material.

In such electrophoretic display device, by supplying current to the electrophoretic capacitor and the ferroelectric capacitor, the electrophoretic particles are permitted to migrate to conduct a display and thus a polarity of the ferroelectric layer is reversed. The polarization (remanent polarization) of such the ferroelectric layer is bistable, so that even though the current supply is stopped later, the charge of the electrophoretic capacitor is maintained to retain the display (to improve a retaining property).

However, in such electrophoretic display device, the retaining property described above sometimes can not be obtained depending on a condition of the electrophoretic capacitor and the ferroelectric capacitor.

SUMMARY

An advantage of the present invention is to provide an electrophoretic display device that can securely retain a display even if current supply is stopped, and electronic apparatus that is provided with the electrophoretic display to have high reliability.

The above advantage is attained by the following aspects of the invention.

An electrophoretic display device according to a first aspect of the invention includes: an electrophoretic capacitor provided with an electrophoretic layer containing at least one kind of electrophoretic particle; and a ferroelectric capacitor provided with a ferroelectric layer containing a ferroelectric material. In the electrophoretic display device, the electrophoretic particle is allowed to move to conduct a display and thus a polarity of the ferroelectric layer is inverted by a current supply to the electrophoretic capacitor and the ferroelectric capacitor that are electrically connected with each other; and even after the current supply is stopped, the display can be retained due to a remanent polarization of the ferroelectric layer. In the electrophoretic display device, a formula (A) and a formula (B) are satisfied when a voltage to be applied to the ferroelectric capacitor is $V_f$, a charge stored in the ferroelectric capacitor when the voltage $V_f$ is applied to the ferroelectric capacitor is $Q_f$, a relative dielectric constant of the ferroelectric material is $\in_f$, an area of the ferroelectric layer in a planar view is $S_f$, a thickness of the ferroelectric layer is $d_f$, a relative dielectric constant of the electrophoretic layer is $\in_{EPD}$, an area of the electrophoretic layer in a planar view is $S_{EPD}$, and a thickness of the electrophoretic layer is $d_{EPD}$:

$$\in_o \cdot \in_{EPD} \cdot S_{EPD} \cdot V/d_{EPD} > P_r \cdot S_f + \in_o \cdot \in_f \cdot S_f \cdot E_c + \in_o \cdot \in_{EPD} \cdot S_{EPD}/d_{EPD} \cdot E_c \cdot d_f \quad (A),$$

$$P_r \cdot S_f < \in_o \cdot \in_f \cdot S_f \cdot E_c + \in_o \cdot \in_{EPD} \cdot S_{EPD}/d_{EPD} \cdot E_c \cdot d_f \quad (B).$$

Thus, the display is securely retained even if the current supply is stopped.

In the electrophoretic display device of the aspect, it is preferable that a formula (C) be satisfied when a breakdown field of the ferroelectric layer is $E_{BD}$:

$$\in_o \cdot \in_{EPD} \cdot S_{EPD} \cdot V/d_{EPD} < P_r \cdot S_f + \in_o \cdot \in_f \cdot S_f \cdot E_c + \in_o \cdot \in_{EPD} \cdot S_{EPD}/d_{EPD} \cdot E_{BD} \cdot d_f \quad (C).$$

Accordingly, the breakdown of the ferroelectric layer is prevented so as to be able to enhance the reliability of the electrophoretic display device.

In the electrophoretic display device of the aspect, it is preferable that the ferroelectric material contain at least one of vinylidene fluoride-trifluoroethylene copolymer and vinylidene fluoride polymer.

Accordingly, the ferroelectric capacitor can be formed by a process at a relatively low temperature. Therefore, a flexible electrophoretic display device can be realized by employing a flexible substrate such as a resin substrate as a substrate for supporting the electrophoretic capacitor and the ferroelectric capacitor.

The electrophoretic display device of the aspect, further includes: a common electrode; and a plurality of individual electrodes opposed to the common electrode. It is preferable that the electrophoretic layer be interposed between the common electrode and each of the individual electrodes, and the ferroelectric layer be interposed between the individual electrodes and the electrophoretic layer.

Accordingly, the structure and manufacture of the electrophoretic display device are simplified, being able to achieve a low cost.

In the electrophoretic display device of the aspect, it is preferable that the electrophoretic capacitor include a common electrode and a plurality of individual electrodes opposed to the common electrode; the electrophoretic layer be interposed between the common electrode and each of the individual electrodes; the ferroelectric capacitor include a plurality of electrode pairs provided as separate bodies from the common electrode and the individual electrodes in a manner corresponding to each of the individual electrodes; and the ferroelectric layer be interposed between the electrode pairs.

Such structure can enhance a degree of freedom on designing the ferroelectric capacitor.

An electronic apparatus according to a second aspect of the invention includes an electrophoretic display device including: an electrophoretic capacitor provided with an electrophoretic layer containing at least one kind of electrophoretic particle; and a ferroelectric capacitor provided with a ferroelectric layer containing a ferroelectric material. In the electrophoretic display device of the electronic apparatus, the electrophoretic particle is allowed to move to conduct a display and thus a polarity of the ferroelectric layer is inverted by a current supply to the electrophoretic capacitor and the ferroelectric capacitor that are electrically connected with each other, and the display can be retained due to a remanent polarization of the ferroelectric layer even after the current supply is stopped. Further, a formula (A) and a formula (B) are satisfied when a voltage to be applied to the ferroelectric capacitor is $V_f$, a charge stored in the ferroelectric capacitor when the voltage $V_f$ is applied to the ferroelectric capacitor is $Q_f$, a relative dielectric constant of the ferroelectric material is $\in_f$, an area of the ferroelectric layer in a planar view is $S_f$, a thickness of the ferroelectric layer is $d_f$, a relative dielectric constant of the electrophoretic layer is $\in_{EPD}$, an area of the electrophoretic layer in a planar view is $S_{EPD}$, and a thickness of the electrophoretic layer is $d_{EPD}$:

$$\in_o \cdot \in_{EPD} \cdot S_{EPD} \cdot V/d_{EPD} > P_r \cdot S_f + \in_o \cdot \in_f \cdot S_f \cdot E_c + \in_o \cdot \in_{EPD} \cdot S_{EPD}/d_{EDP} \cdot E_c \cdot d_f \quad (A),$$

$$P_r \cdot S_f < \in_o \cdot \in_f \cdot S_f \cdot E_c + \in_o \cdot \in_{EPD} \cdot S_{EPD}/d_{EPD} \cdot E_c \cdot d_f \quad (B).$$

Accordingly, the display can be securely retained even if the current supply is stopped, being able to provide an electronic apparatus having high reliability.

BRIEF DESCRIPTION OF THE DRAWINGS

The invention will be described with reference to the accompanying drawings wherein like numbers reference like elements.

DESCRIPTION OF EXEMPLARY EMBODIMENTS

An electrophoretic display device and an electronic apparatus will now be described in detail based on preferred embodiments with reference to the accompanying drawings.

First Embodiment

Figure 1:
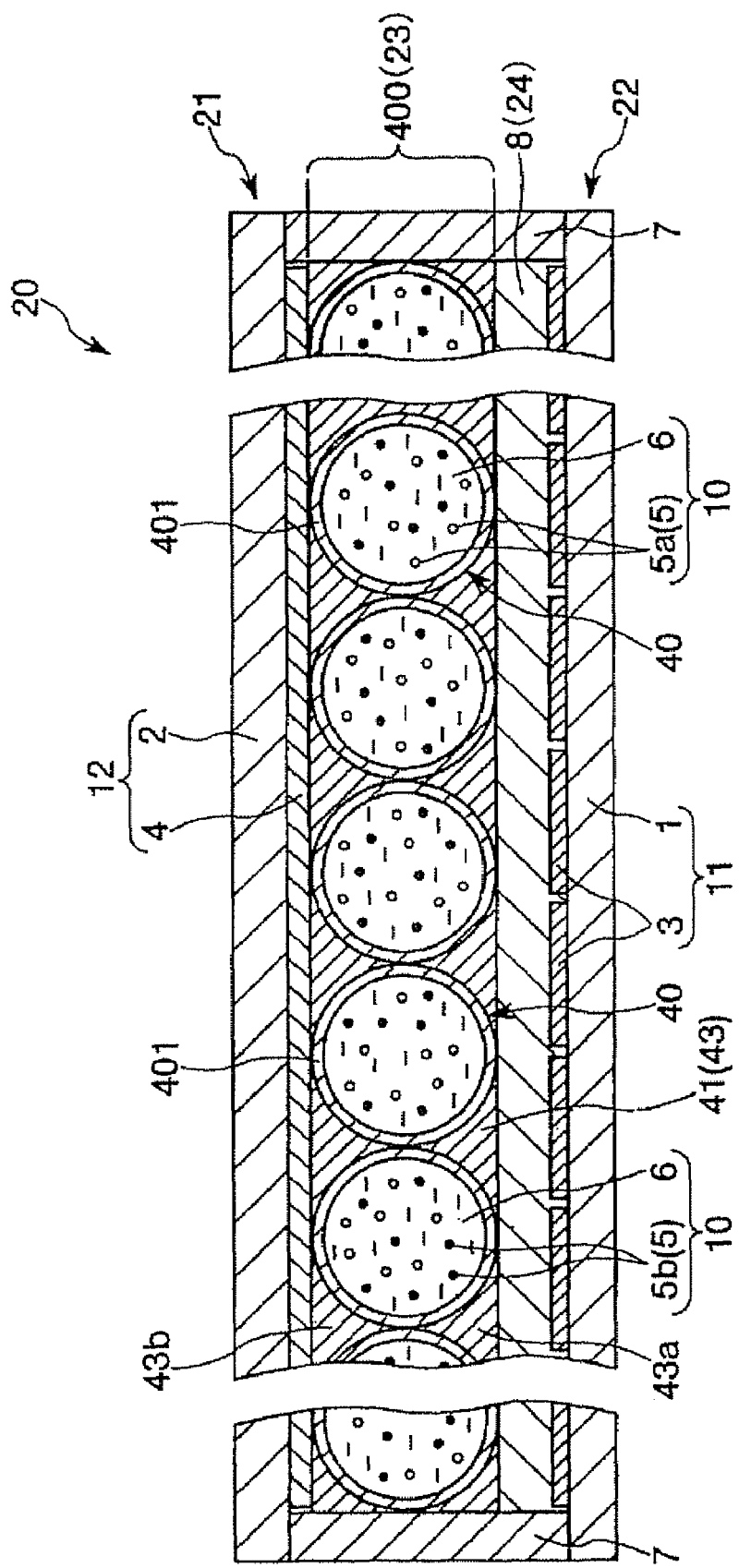
FIG. 1 is a longitudinal-sectional view schematically illustrating an electrophoretic display device according to a first embodiment of the invention.

FIG. 1 is a longitudinal-sectional view schematically illustrating an electrophoretic display device of a first embodiment. In the following description, the top side in FIG. 1 is described as "up", while the bottom side is described as "down" for simplifying the description.

This electrophoretic display device 20 shown in FIG. 1 includes an electrophoretic display sheet (front plane) 21, a circuit substrate (back plane) 22, a ferroelectric layer 8 interposed between the electrophoretic display sheet 21 and the circuit substrate 22, and a sealing part 7 air-tightly sealing a gap between the electrophoretic display sheet 21 and the circuit substrate 22.

The electrophoretic display sheet 21 includes a substrate 12 and an electrophoretic dispersion liquid layer (a microcapsule containing layer) 400. The substrate 12 includes a base 2 having a plate shape and an electrode 4 disposed on the under surface of the base 2, while the electrophoretic dispersion liquid layer 400 includes microcapsules 40 and a binder 41.

On the other hand, the circuit substrate 22 includes a counter substrate 11 and a circuit (not shown) provided to the counter substrate 11 (a base 1). The counter substrate 11 includes the base 1 having a plate shape and a plurality of electrodes 3 provided on the upper surface of the base 1. The circuit includes a switching element such as TFT.

Figure 2:
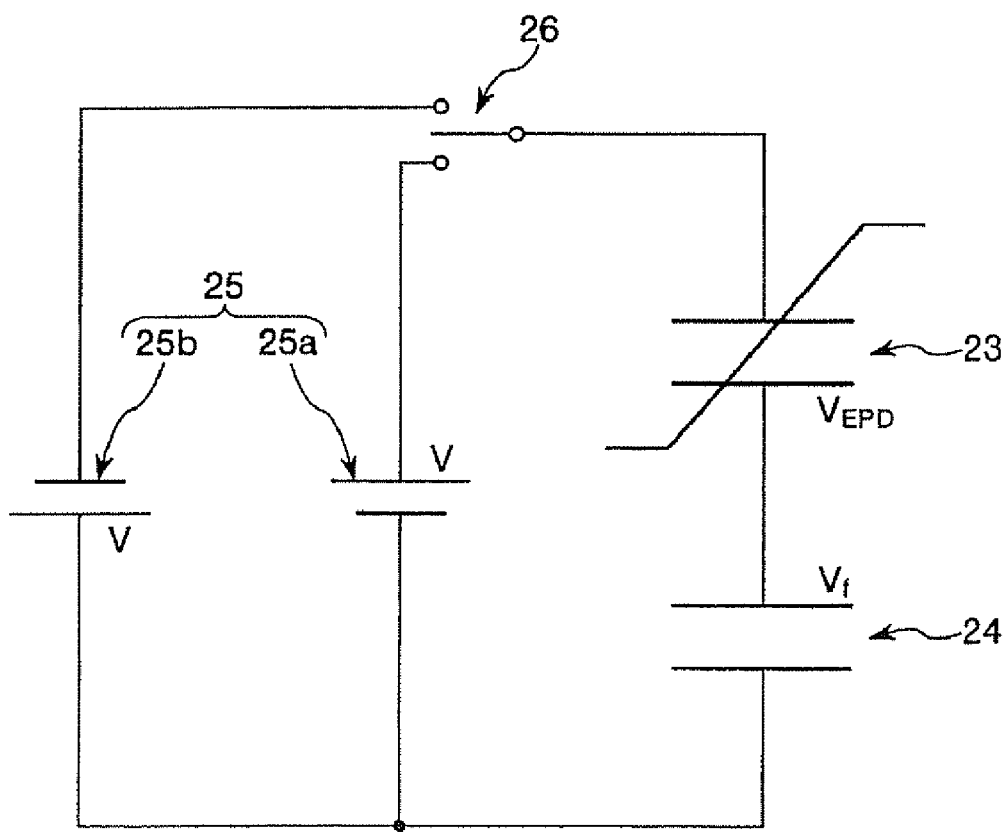
FIG. 2 is a circuit diagram showing a structure of the electrophoretic display device illustrated in FIG. 1.

Thus, in the electrophoretic display device 20, the electrophoretic dispersion liquid layer 400 is interposed between a pair of electrodes 3 and 4, and the ferroelectric layer 8 is interposed between the electrode 3 and the electrophoretic dispersion liquid layer 400. As shown in FIG. 2, an electrophoretic capacitor 23 including the electrophoretic dispersion liquid layer 400 and a ferroelectric capacitor 24 including the ferroelectric layer 8 are electrically coupled in series with a power source 25 through a switch 26. Thus the structure and manufacture of the electrophoretic display device 20 are simplified, being able to achieve a low cost.

The power source 25 includes a power source 25a and a power source 25b that are formed to have opposite polarities to each other. The switch 26 is coupled such that it can switch two states that are a state connecting the power source 25a and a state connecting the power source 25b with respect to the electrophoretic capacitor 23 and the ferroelectric capacitor 24.

By supplying current to the electrophoretic capacitor 23 and the ferroelectric capacitor 24 in a state that they are electrically connected in series, the electrophoretic display device 20 allows the electrophoretic particles to migrate to conduct a display and inverts polarities of the ferroelectric layer 8. The electrophoretic display device 20 can retain the display due to a remanent polarization of the ferroelectric layer 8 even after the current supply is stopped.

A structure of each element will now be described sequentially.

Each of the base 1 and the base 2 is composed of a sheet (tabular) member, and supports and protects each component disposed between them.

Each of the base 1 and the base 2 can be flexible or hard, but is preferably flexible. By employing the bases 1 and 2 having flexibility, the electrophoretic display device 20 having flexibility, that is, being suitable for forming an electronic paper, for example, can be obtained.

In a case where each of the bases 1 and 2 has flexibility, one or more than one in mixture of the following constituent materials can be used for the bases 1 and 2: for example, polyolefin such as polyethylene, polypropylene, and ethylene-vinyl acetate copolymer; crystalline liquid polymer such as modified polyolefin, polyamide (e.g., nylon-6, nylon-46, nylon-66, nylon-610, nylon-612, nylon-11, nylon-12, nylon-6-12, and nylon-6-66), thermoplastic polyimide, and aromatic polyester; and various thermoplastic elastomers such as polyphenylene oxide, polyphenylene sulfide, polycarbonate, polymethyl methacrylate, polyether, polyether ether ketone, polyetherimide, polyacetal, styrene series, polyolefine series, polyvinylchloride series, polyurethane series, polyester series like polyethylene terephthalate (PET), polyamide series, polybutadiene series, transpolyisoprene series, fluororubber series, and chlorinated polyethylene series; or copolymers, blended materials, and polymer alloys that primarily contain the above materials.

The average thicknesses of the bases 1 and 2 are not limited, but are accordingly determined depending on their constituent materials, applications, or the like. If the bases 1 and 2 have flexibility, it is preferable that the thickness be from about 20 µm to about 500 µm, more preferably from about 25 µm to about 250 µm. Accordingly, the electrophoretic display device 20 can be downsized (especially thinned) while harmonizing flexibility with strength thereof.

On the upper surface of the base 1, which is adjacent to the microcapsules 40, the electrodes 3 are provided in a layer (film) state, while on the lower surface of the base 2, which is adjacent to the microcapsules 40, the electrode 4 is provided in a layer (film) state.

Applying a voltage between the electrodes 3 and the electrode 4 generates an electric field therebetween, whereby the electric field acts on electrophoretic particles (display particles) 5.

In the embodiment, the electrode 4 is a common electrode, while the electrodes 3 are individual electrodes that are arranged in matrix (pixel electrodes connected to a switching element). A part where one electrode 3 overlaps with the electrode 4 forms one pixel.

Here, the electrode 4 may be formed in a plural manner like the electrodes 3.

Alternatively, such structure may be employed that both the electrodes 3 and the electrode 4 are formed in a stripe shape and arranged to intersect each other.

Constituent materials of each of the electrodes 3 and the electrode 4 are not limited as long as they are substantively conductive. One or more than one in mixtures of the following conductive materials can be used: for example, metals such as copper, aluminum, nickel, cobalt, platinum, gold, silver, molybdenum, tantalum, and alloys of these metals; carbonaceous materials such as carbon black, carbon nanotube, and fullerene; electron conductive polymer materials such as polyacetylene, polypyrrole, polythiophene, polyaniline, poly (p-phenylene), poly (p-phenylene vinylene), polyfluorene, polycarbazole, polysilane, and derivatives of these polymer materials; ion conductive polymer materials obtained by dispersing an ionic material such as NaCl, $LiClO_4$, KCl, $H_2O$, LiCl, LiBr, LiI, $LiNO_3$, LiSCN, $LiCF_3SO_3$, NaBr, NaI, NaSCN, $NaClO_4$, $NaCF_3SO_3$, KI, KSCN, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, and $Cu(CF_3SO_3)_2$ in a matrix resin such as polyvinyl alcohol, poly carbonate, polyethylene oxide, polyvinyl butyral, polyvinyl carbazole, and vinyl acetate; and conductive oxide materials such as indium tin oxide (ITO), fluoride doped tin oxide (FTO), tin oxide ($SnO_2$), and indium oxide (IO).

Other than the above-described materials, various composite materials can be used for the electrodes 3 and the electrode 4: for example, composite materials to which a conductive property is given by mixing a conductive material (conductive particles) such as gold, silver, nickel, and carbon into a non-conductive material such as a glass material, a rubber material, and a polymer material.

Specific examples of the composite materials include: a conductive rubber obtained by mixing a conductive material into a rubber material; a conductive adhesive or a conductive paste obtained by mixing a conductive material into an epoxy-, urethane-, or acrylic-adhesive composition; and a conductive resin obtained by mixing a conductive material into a matrix resin such as polyolefin, polyvinyl chloride, polystyrene, ABS resin, nylon (polyamide), ethylene vinyl acetate copolymer, polyester, acrylic resin, epoxy resin, and urethane resin.

Average thicknesses of the electrodes 3 and the electrode 4 are not limited, but are respectively determined depending on their constituent materials, applications, or the like. It is preferable that the average thicknesses be from about 0.05 µm to about 10 µm, more preferably from about 0.05 µLm to about 5 µm.

Among the bases 1 and 2 and the electrodes 3 and 4, a base and an electrode located on a display surface side (the base 2 and the electrode 4 in the embodiment) are allowed to have optical transparency, in particular, are allowed to be substantially transparent (colorless and transparent, colored and transparent, or translucent). Accordingly, a state of the electrophoretic particles 5 in an electrophoretic dispersion liquid 10 described later, that is, an information (an image) displayed in the electrophoretic display device 20 can be easily distinguished with eyes.

Here, each of the electrodes 3 and the electrode 4 may have a multilayered structure in which a plurality of materials are layered one upon another, for example, other than a single-layer structure composed of a single material as described above. Namely, each of the electrodes 3 and the electrode 4 may have a single-layer structure made of ITO, or may have a double-layer structure composed of an ITO layer and a polyaniline layer, for example.

To the electrophoretic display sheet 21, the electrophoretic dispersion liquid layer 400 is provided in a manner contacting the lower surface of the electrode 4.

The electrophoretic dispersion liquid layer 400 is structured such that a plurality of microcapsules 40 in which the electrophoretic dispersion liquid 10 is encapsulated in a capsule body (shell) 401 are fixed (held) with the binder 41.

The microcapsules 40 are disposed between the counter substrate 11 and the substrate 12 in single layer so as to be arranged both in a lengthwise line and in a crosswise line without overlapping each other in the thickness direction. In the present embodiment, even though the microcapsules 40 are tightly held by the electrode 4 and the ferroelectric layer 8, they are not compressed (pressed) in the up and down direction, remaining in a nearly spherical shape.

In such the structure, the shape of the microcapsules 40 is maintained spherical, and thus a barrier property and a bleeding property of the microcapsules 40 can be enhanced. Consequently, the electrophoretic display device 20 can be operated stably for a long period of time.

The microcapsules may be compressed in the up and down direction to have a nearly elliptical or rectangular shape, for example, in a longitudinal sectional shape.

In the embodiment, one microcapsule 40 is provided so as to straddle two adjacent electrodes 3. That is, the electrodes 3 are arranged in a planar direction in a predetermined order. The microcapsules 40 are arranged at the same pitch as that of the electrodes 3 while being shifted at a half pitch with respect to the electrodes 3.

Due to this arrangement of the microcapsules 40, one electrode 3 can operate the electrophoretic particles 5 in two microcapsules 40 corresponding to the one electrode 3. Consequently, different colors can be displayed in one microcapsule 40.

The hardness of the capsule body (shell) 401 is not particularly limited. However, the capsule body 401 preferably has hardness with which the body is not deformed by a pressure of 0.2 MPa, more preferably has hardness with which the body is not deformed by a pressure of 0.6 MPa. Accordingly, even though the electrophoretic display sheet 21 is tightly held by the electrode 4 and the ferroelectric layer 8, the capsule body 401 is not deformed in the up and down direction, or even if the capsule body 401 is deformed, the amount of the deformation is small. Thus, the barrier property and the bleeding property of the capsule body 401 can be enhanced.

As a particle diameter of the capsule body 401, a volume average particle size is preferably in a range from 30 μm to 60 μm, more preferably in a range from 40 μm to 50 μm. By setting the particle diameter of the capsule body 401 to be in the above range, the electrophoretic dispersion liquid layer 400 can be formed with high dimensional accuracy.

Examples of a constituent material of the capsule body (shell) 401 include various resin materials such as urethane resin, melamine resin, urea resin, polyamide, and polyether. They can be used singly or in mixture of two or more.

Particularly, it is preferable that the capsule body 401 be primarily made of melamine resin or urea resin. Since such resin forms three dimensional web structure, the strength of the capsule body 401 can be enhanced, being able to securely form the spherical shape mentioned above.

The capsule body 401 may be made of a material in which a cross-linking agent forms a cross-linking (a steric cross-linking). Thus, the strength of the capsule body 401 can be enhanced. As a result, the microcapsules 40 can be more securely prevented from being broken.

It is preferable that such microcapsules 40 have nearly same sizes (particle diameters) as each other. In particular, a variation coefficient (CV value) of a particle diameter is preferably in a range from 5% to 15%, more preferably in a range from 5% to 10%. Accordingly, occurrence of display irregularity in the electrophoretic display device 20 is prevented or reduced, so that the electrophoretic display device 20 can express more excellent display performance.

While the adjacent microcapsules 40 are arranged in a manner contacting each other in the present embodiment, they may be arranged apart from each other.

The microcapsules 40 include white particles 5a and colored particles (black particles) 5b as described later. As a result, the electrophoretic particles 5 included in the microcapsules 40 are operated as described later, being able to make a display even.

The electrophoretic dispersion liquid 10 encapsulated in the capsule body 401 is obtained by dispersing (suspending) at least one type of electrophoretic particles 5 (two types of particles as the colored particles 5b and the white particles 5a, in the present embodiment) in a liquid phase dispersion medium 6.

The electrophoretic particles 5 can be dispersed in the liquid phase dispersion medium 6 by one method or a combination of more than one of the following methods: for example, a paint shaker method, a ball mill method, a media mill method, an ultrasonic dispersion method, and a stirrer dispersion method.

Is preferably used such liquid phase dispersion medium 6 that has low solubility with respect to the capsule body 401 and relatively high insulation properties.

As the liquid phase dispersion medium 6, one or more than one in mixture of the following substances can be used: for example, various water such as distilled water, purified water, ion-exchanged water, and RO water; alcohols such as methanol, ethanol, isopropanol, butanol, octanol, ethylene glycol, diethylene glycol, and glycerin; cellosolves such as methyl cellosolve, ethyl cellosolve, and phenyl cellosolve; esters such as methyl acetate, ethyl acetate, butyl acetate, and ethyl formate; ketones such as acetone, methyl ethyl ketone, diethyl ketone, methyl isobutyl ketone, methyl isopropyl ketone, and cyclohexanone; aliphatic hydrocarbons (liquid paraffin) such as pentane, hexane, and octane; alicyclic hydrocarbons such as cyclohexane, and methyl cyclohexane; aromatic hydrocarbons such as benzenes having a long-chain alkyl group such as benzene, toluene, xylene, hexyl benzene, heptyl benzene, octyl benzene, nonyl benzene, decyl benzene, undecyl benzene, dodecyl benzene, tridecyl benzene, and tetradecyl benzene; halogen hydrocarbons such as methylene chloride, chloroform, carbon tetrachloride, and 1,2-dichloroethane; aromatic heterocycles such as pyridine, pyrazine, furane, pyrrole, thiophene, and methylpyrolidone; nitryles such as acetonitrile, propionitrile, and acrylonitrile; amides such as N,N-dimethylformamide, and N,N-dimethylacetamide; carboxylate salt; and other various oils.

Among these, one primarily made of aliphatic hydrocarbons (liquid paraffin) is preferable for the liquid phase dispersion medium 6. The liquid phase dispersion medium 6 primarily containing liquid paraffin is preferable since it has high aggregation suppressing effect on the electrophoretic particles 5, and low affinity (low solubility) for the constituent material of the capsule body 401. Accordingly, the display performance of the electrophoretic display device 20 can be more securely prevented or suppressed from deteriorating in aging. Liquid paraffin is preferable also from the point of view that it has excellent antiweatherability due to having no unsaturated bonds, and high safety.

Further, branching aliphatic hydrocarbons (isoparaffin) are particularly preferable among aliphatic hydrocarbons (liquid paraffin). Isoparaffin is particularly preferable since it has high aggregation suppressing effect on the electrophoretic particles 5.

Isoparaffin having the number of carbons in a range from 5 to 15 is preferably used, and the one having the number of carbons in a range from 8 to 15 is more preferably used. The use of isoparaffin having the number of carbons in the above range for the liquid phase dispersion medium 6 can provide the following advantageous effect: the electrophoretic particles 5 have sufficiently small sedimentation speed due to a small difference between specific gravity of the liquid phase dispersion medium 6 and that of the electrophoretic particles 5, and at the same time, the viscosity of the liquid phase dispersion medium 6 (the electrophoretic dispersion liquid 10) is prevented from unnecessarily increasing. As a result, the display performance (particularly, response speed and retaining property) of the electrophoretic display device 20 can be improved.

Such isoparaffin may be used singly or in mixture of two or more.

In addition, if necessary, the following various additives may be added to the liquid phase dispersion medium 6: charge controlling agents formed of particles of such as electrolytes, (anionic or cationic) surfactants, metal soaps, resins, rubbers, oils, varnishes, and compounds; dispersive agents such as titanium coupling agents, aluminum coupling agents, and silane coupling agents; lubricating agents; and stabilizing agents.

Examples of surfactants include alkenyl succinic acid ester and alkenyl succinic acid polyimide.

Moreover, if necessary, the following various dyes may be solved in the liquid phase dispersion medium 6: anthraquinone dye, azo dye, indigoid dye, triphenylmethane dye, pyrazolone dye, stilbene dye, diphenylmethane dye, xanthene dye, alizarin dye, acridine dye, quinonimine dye, thiazole dye, methine dye, nitro dye, nitroso dye, or the like.

Any particles can be used for the electrophoretic particles 5 as long as they have charges and can be electrophoresed in the liquid phase dispersion medium 6 by an application of an electric field. However, at least one of pigment particles, resin particles, and compound particles of the pigment particles and the resin particles is preferably used. These particles have such advantages that they are easily manufactured and their charges can be controlled with relative ease.

As pigments included in pigment particles, one or more than one in mixture of the following pigments can be used: for example, black pigments such as aniline black, carbon black, and titanium black; white pigments such as titanium oxide, antimony oxide, barium sulfate, zinc sulfide, zinc flower, silicon oxide, and aluminum oxide; azo pigments such as monoazo, disazo, and polyazo; yellow pigments such as isoindolinone, chrome yellow, yellow iron oxide, cadmium yellow, titanium yellow, and antimony; red pigments such as quinacridone red, and chrome vermilion; blue pigments such as phthalocyanine blue, indanthrene blue, iron blue, ultramarine blue, and cobalt blue; and green pigments such as phthalocyanine green.

As a resin material included in resin particles, one or more than one in mixture of the following exemplary materials can be used: acrylic resin, urethane resin, urea resin, epoxy resin, polystyrene, and polyester.

Examples of composite particles include: pigment particles having a surface coated with a resin material or another pigment; resin particles having a surface coated with a pigment; and particles obtained by mixing a pigment and a resin material at an adequate ratio.

The pigment particles having a surface coated with another pigment may be, for example, titanium oxide particles having a surface coated with silicon oxide or aluminum oxide. Those particles are preferably used as the white particles 5a.

Carbon black particles or carbon black particles having a coated surface are preferably used as the colored particles (black particles) 5b.

The shape of the electrophoretic particles 5 is not limited, but a spherical shape is preferable.

The average diameter of the electrophoretic particles 5 is preferably in a range from about 10 nm to about 500 nm, and more preferably in a range from about 20 nm to about 300 nm. By setting the average diameter of the electrophoretic particles 5 to be in the above range, aggregation of the electrophoretic particles 5 or sedimentation in the liquid phase dispersion medium 6 can be securely prevented. As a result, deterioration of display quality of the electrophoretic display device 20 can be preferably prevented.

In a case where two different types of particles are used as in the present embodiment, the average diameters of two types of particles are preferably set to be different. Particularly, it is preferable that the average diameter of the white particles 5a be larger than that of the colored particles 5b. This setting can further enhance the display contrast and the retaining property of the electrophoretic display device 20.

Specifically, the average diameter of the colored particles 5b is preferably in a range from about 20 nm to about 100 nm, while the average diameter of the white particles 5a is preferably in a range from about 150 nm to about 300 nm.

In addition, it is preferable that the specific gravity of the electrophoretic particles 5 be set to be nearly same as that of the liquid phase dispersion medium 6. Accordingly, the electrophoretic particles 5 can stay at a fixed position in the liquid phase dispersion medium 6 for a long period of time even after a voltage application between the electrodes 3 and the electrode 4 is stopped. Namely, information displayed on the electrophoretic display device 20 is retained for a long period of time.

The binder 41 is provided for bonding the counter substrate 11 and the substrate 12; for fixing the counter substrate 11, the substrate 12 and the microcapsules 40; and for securing the insulation property between the electrodes 3 and the electrode 4. Accordingly, durability and reliability of the electrophoretic display device 20 can be further enhanced.

As the binder 41, a resin material that has a superior affinity (adhesion) for each of the electrodes 3, the electrode 4, and the capsule body 401 (microcapsules 40), and has superior insulation properties is preferably used.

As the binder 41, one or more than one in mixture of the following resin materials can be used: for example, thermoplastic resins such as polyethylene, chlorinated polyethylene, ethylene-vinyl acetate copolymer, ethylene-ethyl acrylate copolymer, polypropylene, AS resin, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, and cellulose-based resin; polymers such as polyamide-based resin, polyacetal, polycarbonate, polyethylene terephthalate, polybutylene terephthalate, polyphenylene oxide, polysulfone, polyamide imide, polyamino bis-maleimide, polyether sulfone, polyphenylene sulfone, polyarylate, grafted polyphenylene ether, polyether ether ketone, and polyether imide; fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, and fluororubber; silicone based resins such as silicone resin and silicone rubber; urethane based resins such as polyurethane; and, as other agents, methacrylic acid-styrene copolymer, polybutylene, and methyl methacrylate-butadiene-styrene copolymer.

The dielectric constant of the binder 41 is preferably set to be nearly same as that of the liquid phase dispersion medium 6. Therefore, it is preferable that a dielectric constant regulator such as alcohols that are, for example, 1,2-butanediol and 1,4-butanediol; ketones; and carboxylates be added to the binder 41.

In the embodiment, the electrophoretic display sheet 21 and the circuit substrate 22 are bonded with the ferroelectric layer 8 interposed therebetween. Therefore, the electrophoretic display sheet 21 and the circuit substrate 22 can be more securely fixed.

The ferroelectric layer 8 is primarily made of a ferroelectric material. Since such the ferroelectric layer 8 has an insulation property, it can securely prevent the short between the electrodes 3 and the electrode 4 so as to be able to allow an electric field to securely act on the electrophoretic particles 5.

It is preferable that the ferroelectric layer 8 have the following three functions as well as the one described above. A first functions is preventing a diffusion of an ion from an electrophoretic display sheet 21 side to the circuit substrate 22. A second function is absorbing and maintaining moisture entering the electrophoretic display device 20. A third function is reducing stress generated in bonding the electrophoretic display sheet 21 and the circuit substrate 22.

The first function can prevent or suppress deterioration of the characteristics of a circuit (especially, of switching elements) provided to the circuit substrate 22.

The second function can prevent or suppress moisture from diffusing in the microcapsules 40, a circuit provided to the circuit substrate 22, and the like even if moisture enters the electrophoretic display device 20, thereby being able to prevent deterioration of the microcapsules 40, the circuit, and the like.

The third function can prevent the microcapsules 40, switching elements provided to the circuit substrate 22, and the like from being broken in manufacturing (making) the electrophoretic display device 20.

The ferroelectric layer 8 preferably has at least one of the first to the third functions, more preferably any two or more of the functions, and yet more preferably all functions. Accordingly, durability and reliability of the electrophoretic display device 20 can be further enhanced.

The ferroelectric material that is a constituent material of such the ferroelectric layer 8 is not limited. Various inorganic ferroelectric materials and various organic ferroelectric materials can be employed, but it is preferable to employ organic ferroelectric materials.

In a case where the organic ferroelectric materials are employed as the constituent material of the ferroelectric layer 8, the ferroelectric layer 8 can be formed by a method in which a liquid phase thin film forming process such as spin coating is combined with a crystallization process, with a liquid containing an organic ferroelectric material, for example. Therefore, the ferroelectric layer 8 can be formed under a condition of nearly normal temperature and normal pressure without using a large vacuum device used in the vapor phase thin film forming process, being able to achieve energy saving and cost decreasing in manufacturing thereof. In addition, since the ferroelectric layer 8 can be formed under a condition of relatively low temperature, a material having relatively low melting and softening points can be used for each element of the electrophoretic display device 20. Therefore, the electrophoretic display device 20 can be made flexible with relative ease with a material such as a resin.

As the organic ferroelectric materials, one containing at least one of vinylidene fluoride-trifluoroethylene copolymer and vinylidene fluoride polymer is preferably used.

Examples of the inorganic ferroelectric materials include: oxides having a perovskite type crystal structure of $BaTiO_3$, $Pb(Zr,Ti)O_3$, and the like; and oxides having a layered perovskite type crystal structure of $SrBi_2Ta_2O_9$, $(Bi,La)_4Ti_3O_{12}$, and the like.

Further, it is preferable that a polarization axis of the ferroelectric layer 8 be deflected in a manner corresponding to the thickness direction as much as possible. Accordingly, the ferroelectric capacitor including the ferroelectric layer 8 has an excellent responsiveness of polarization reversal and excellent hysteresis property.

A practical value of the average thickness of the ferroelectric layer 8 is not limited, but is preferably about 1 µm to about 30 µm, and more preferably about 5 µm to about 20 µm.

The sealing part 7 is provided between the bases 1 and 2 along the peripheries of them. The sealing part 7 air-tightly seals the electrodes 3, the electrode 4, the electrophoretic dispersion liquid layer 400, and the ferroelectric layer 8. Therefore, moisture is prevented from entering the electrophoretic display device 20, and thus the electrophoretic display device 20 can be more securely prevented from deteriorating its display performance.

As the sealing part 7, one or more than one in mixture of the following resin materials can be used: thermoplastic resins such as acrylic resins, urethane resins, and olefinic resins; and thermoset resins such as epoxy resins, melamine resins, and phenol resins.

The sealing part 7 may be provided if needed or may be not provided.

Such the electrophoretic display device 20 is operated as described below.

A method for operating (working) the electrophoretic display device 20 will be now described.

Figures 3A, 3B:
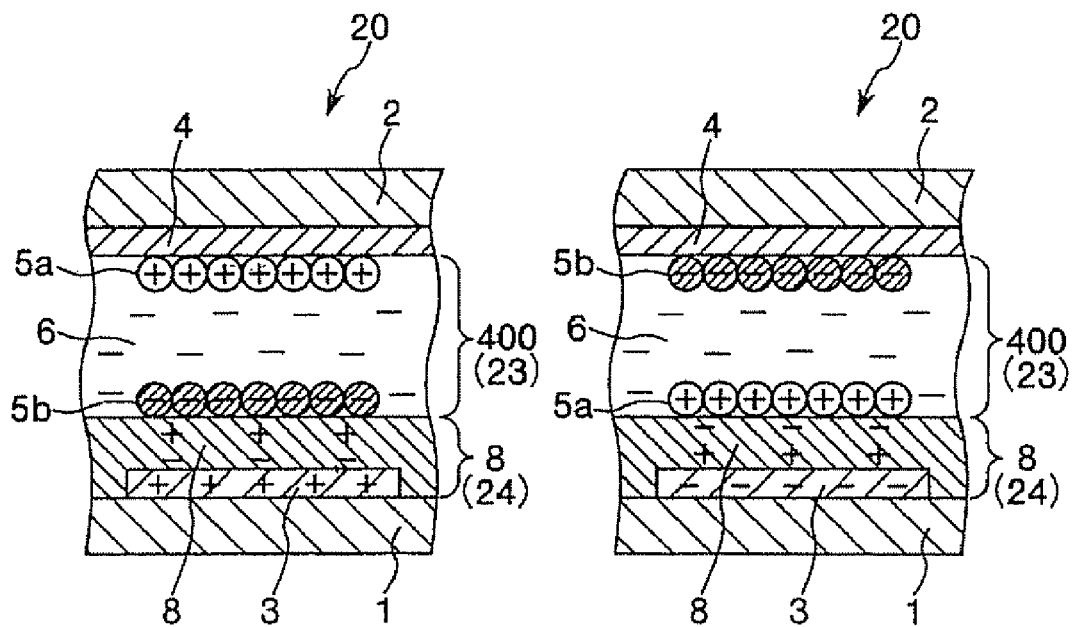
FIGS. 3A and 3B are schematic diagrams showing a principle of operation of the electrophoretic display device illustrated in FIG. 1.

FIGS. 3A and 3B are schematic views illustrating a method for operating the electrophoretic display device shown in FIG. 1. In the following description, the top side in FIGS. 3A and 3B is described as "up", while the bottom side is described as "down".

If a voltage is applied between the electrodes 3 and the electrode 4 in the electrophoretic display device 20, an electric field is generated between them. That is, an electric field is generated in each of the electrophoretic capacitor 23 (the electrophoretic dispersion liquid layer 400) and the ferroelectric capacitor 24 (the ferroelectric layer 8).

The electrophoretic particles 5 (the colored particles 5b, the white particles 5a) are electrophoresed toward either electrode depending on the electric field generated in the electrophoretic dispersion liquid layer 400.

For example, in a case where the white particles 5a have positive charges and the colored particles (the black particles) 5b have negative charges, if the electrodes 3 are set at positive potential, the white particles 5a move toward the electrode 4 to gather at the electrode 4 as shown in FIG. 3A. On the other hand, the colored particles 5b move toward the electrodes 3 to gather at the electrodes 3. Therefore, the color of the electrophoretic particles 5a, i.e. white can be seen from above the electrophoretic display device 20 (from the display face side).

In contrast, as shown in FIG. 3B, if the electrodes 3 are set at negative potential, the white particles 5a move toward the electrodes 3 to gather at the electrodes 3. On the other hand, the colored particles 5b move toward the electrode 4 to gather at the electrode 4. Therefore, the color of the colored particles 5b, i.e. black can be seen from above the electrophoretic display device 20 (from the display face side).

In such structure, charged amount of the electrophoretic particles 5 (the white particles 5a and the colored particles 5b), polarities of the electrodes 3 and the electrode 4, and a potential difference between the electrodes 3 and the electrode 4 are adequately set. Consequently, desired information (image) is displayed on the display surface side of the electrophoretic display device 20 in accordance with the color combination of the white particles 5a and the colored particles 5b, or the number of particles gathering at the electrodes 3 and the electrode 4.

In a case where the electrodes 3 are at positive potential as shown in FIG. 3A, the ferroelectric layer 8 is polarized in a thickness direction such that the electrode 4 side is set at positive potential and the electrodes 3 side is set at negative potential due to an electric field generated in the ferroelectric layer 8.

In contrast, in a case where the electrodes 3 are at negative potential as shown in FIG. 3B, the ferroelectric layer 8 is polarized in a thickness direction such that the electrode 4 side is set at negative potential and the electrodes 3 side is set at positive potential, due to an electric field generated in the ferroelectric layer 8.

Since a voltage larger than an anti-voltage is applied to the ferroelectric layer 8 as described later, the polarization state generated in the ferroelectric layer 8 is bistable, so that the polarization state is retained even after the application of the voltage is stopped.

Thus, current supply to the electrophoretic capacitor 23 and the ferroelectric capacitor 24 that are electrically connected in series electrophoreses the electrophoretic particles to make a display, and reverses the polarities of the ferroelectric layer 8. Further, even after the current supply is stopped, the display can be retained due to the remanent polarization of the ferroelectric layer 8.

Here will be described conditions for enabling the display to be retained even after the current supply is stopped.

Figure 4:
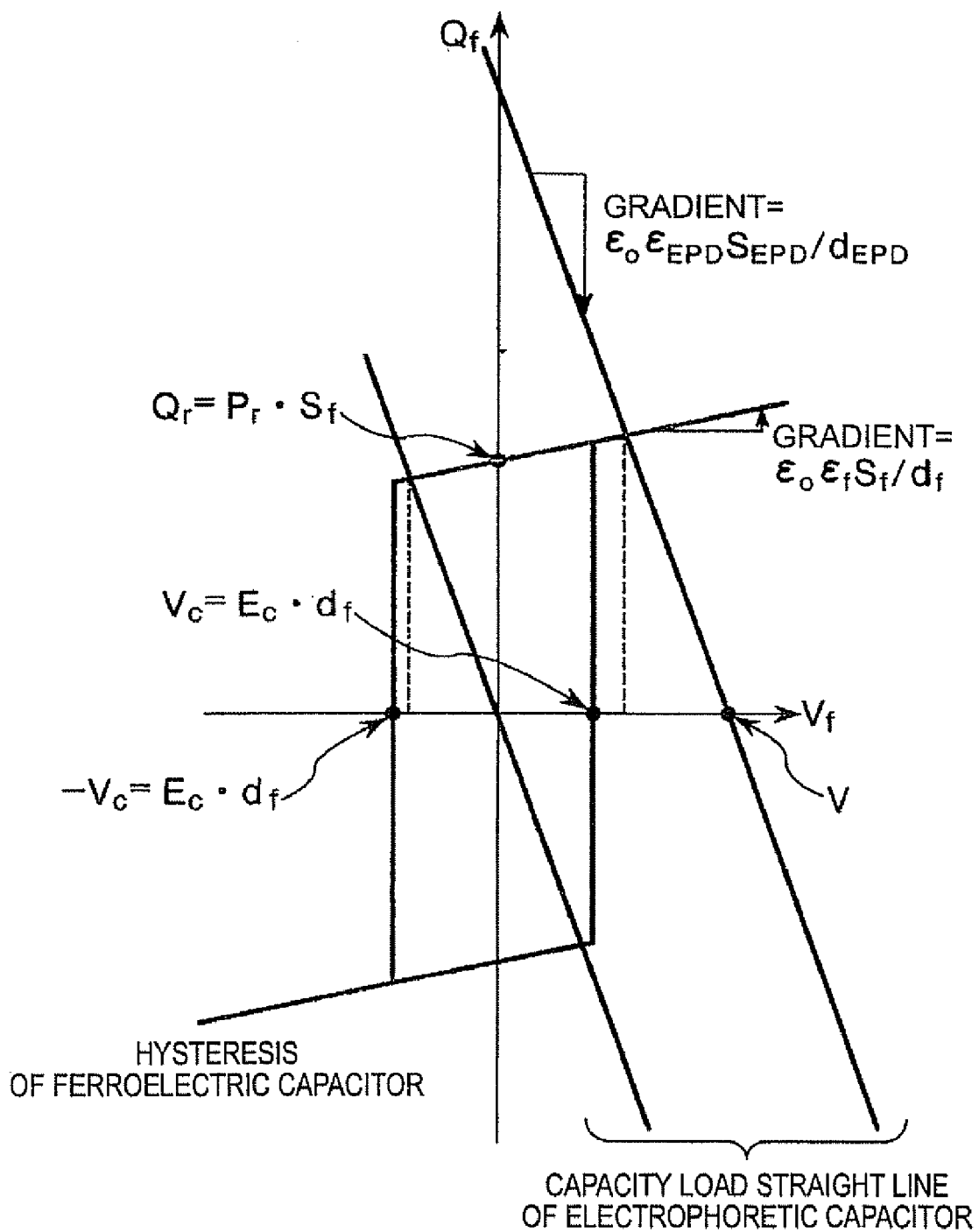
FIG. 4 is a graph showing a capacity load straight line of an electrophoretic capacitor and a hysteresis curve of a ferroelectric capacitor in the electrophoretic display device illustrated in FIG. 1.
Figure 5:
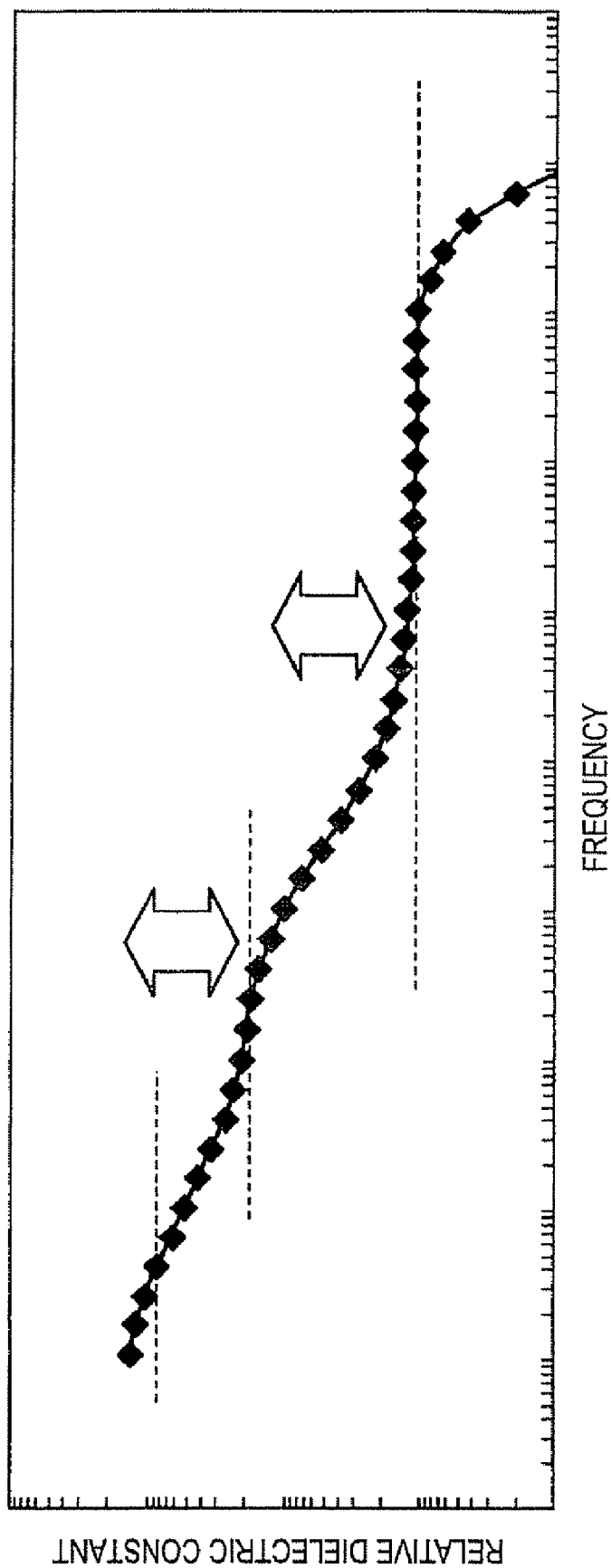
FIG. 5 is a graph showing a relation between a relative dielectric constant of a ferroelectric substance and an on/off frequency of a voltage to be applied to the ferroelectric substance.
Figure 6:
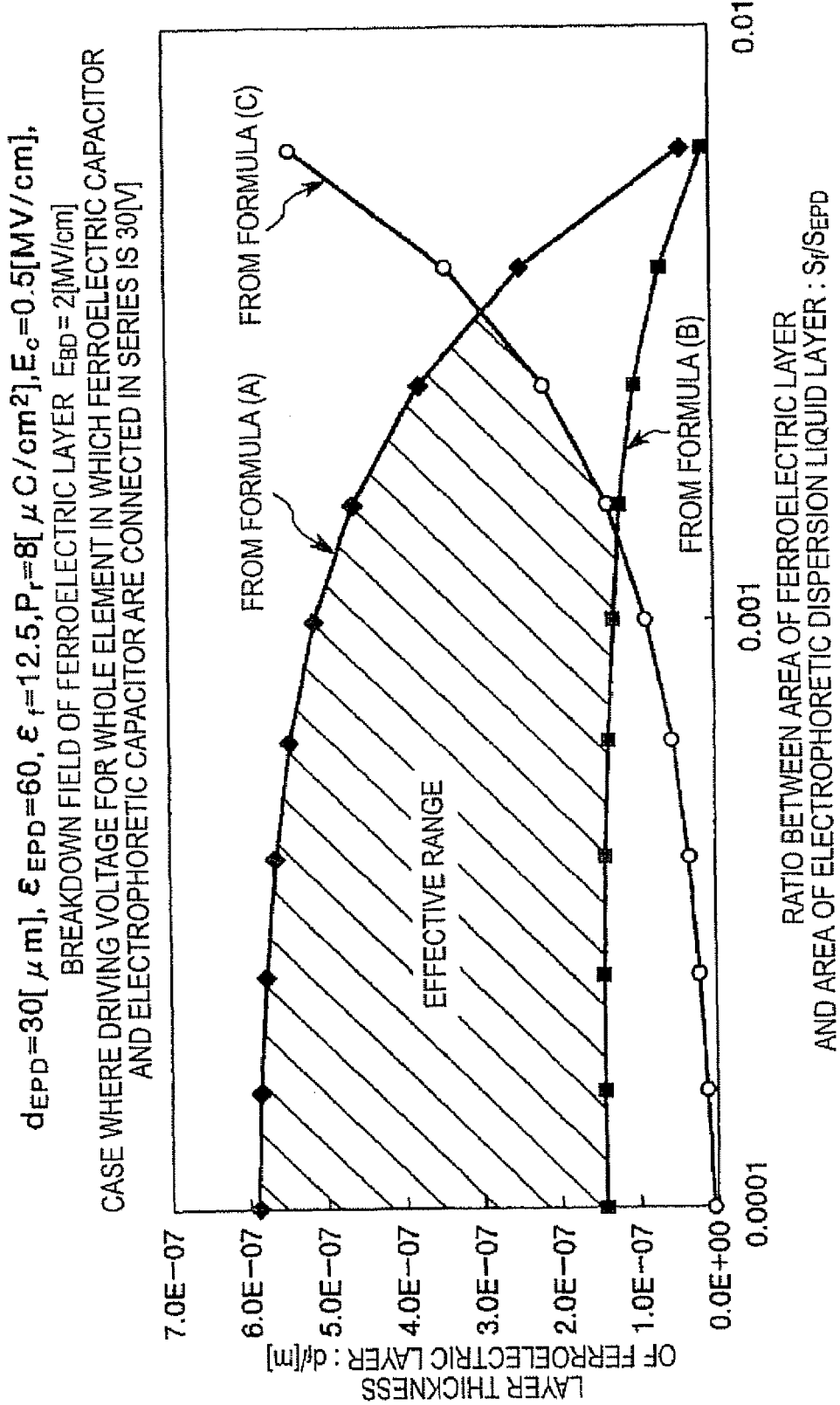
FIG. 6 is a graph showing an example of a relation between a layer thickness of a ferroelectric layer and a ratio between an area $S_f$ of the ferroelectric layer and an area $S_{EPD}$ of an electrophoretic dispersion liquid layer.

FIG. 4 is a graph showing a capacity load straight line of the electrophoretic capacitor and a hysteresis curve of the ferroelectric capacitor in the electrophoretic display device illustrated in FIG. 1. FIG. 5 is a graph showing a relation between a relative dielectric constant of a ferroelectric substance and an on/off frequency of a voltage to be applied to the ferroelectric substance. FIG. 6 is a graph showing an example of a relation between a layer thickness of a ferroelectric layer and a ratio between an area $S_f$ of the ferroelectric layer in a planar view and an area $S_{EPD}$ of an electrophoretic dispersion liquid layer in a planar view.

Here, the area $S_f$ of the ferroelectric layer 8 in a planar view indicates an area of the ferroelectric layer 8 existing between the electrode 4 and the electrodes 3 in planar view (that is, an effective area contributing for the ferroelectric capacitor 24). The area $S_{EPD}$ of the electrophoretic dispersion liquid layer in a planar view indicates an area of the electrophoretic dispersion liquid layer 400 existing between the electrode 4 and the electrodes 3 in a planar view (that is, an effective area contributing for the electrophoretic capacitor 23). Hereinafter, the area $S_f$ of the ferroelectric layer 8 in a planar view is referred to as merely "an area of the ferroelectric layer 8", and the area $S_{EPD}$ of the electrophoretic dispersion liquid layer in a planar view is referred to as merely "an area of the electrophoretic dispersion liquid layer 400", as well.

First Condition

The electrophoretic display device 20 described above and shown in FIGS. 1 and 2 satisfies a formula (1), when a voltage to be applied to the ferroelectric capacitor 24 is $V_f$, a charge stored in the ferroelectric capacitor 24 due to the application of the voltage $V_f$ is $Q_f$; a remanent charge of the ferroelectric capacitor 24 when $V_f$ is 0 is $Q_r$, a relative dielectric constant of the ferroelectric layer 8 is $\epsilon_f$; an area of the ferroelectric capacitor 24 is $S_f$, and a thickness of the ferroelectric layer 8 is $d_f$.

$$Q_f = Q_r + \epsilon_o \cdot \epsilon_f \cdot S_f \cdot V_f / d_f \quad (1)$$

In the formula (1), $\epsilon_o$ is a vacuum dielectric constant.

When a voltage of the power source 25 is V and a voltage to be applied to the electrophoretic capacitor 23 is $V_{EPD}$, the following formula is derived because the electrophoretic capacitor 23 and the ferroelectric capacitor 24 are coupled with the power source 25 in series.

$$V_{EPD} = V - V_f$$

When a relative dielectric constant of the electrophoretic dispersion liquid layer 400 is $\epsilon_{EPD}$, an area of the electrophoretic capacitor 23 is $S_{EPD}$, and a thickness of the electrophoretic dispersion liquid layer 400 is $d_{EPD}$, a formula (2) is derived because a charge stored in the electrophoretic capacitor 23 equals to the charge $Q_f$ stored in the ferroelectric capacitor 24 due to the application of the voltage $V_f$.

$$Q_f = \epsilon_o \cdot \epsilon_{EPD} \cdot S_{EPD} \cdot (V - V_f) / d_{EPD} \quad (2)$$

If $Q_f$ is eliminated by the formula (1) and the formula (2), a formula (3) is derived.

$$Q_r + \epsilon_o \cdot \epsilon_f \cdot S_f \cdot V_f / d_f = \epsilon_o \cdot \epsilon_{EPD} \cdot S_{EPD} \cdot (V - V_f) / d_{EPD} \quad (3)$$

If the formula (3) is rearranged, a formula (4) is derived, $$\epsilon_o \cdot \epsilon_{EPD} \cdot V / d_{EPD} - Q_r = (\epsilon_o \cdot \epsilon_f \cdot S_f / d_f + \epsilon_o \cdot \epsilon_{EPD} \cdot S_{EPD} / d_{EPD}) \cdot V_f \quad (4)$$

The left side of the formula (4) has to be a positive value, a formula (5) is derived.

$$\epsilon_o \cdot \epsilon_{EPD} \cdot V \cdot S_{EPD} / d_{EPD} - Q_r > 0 \quad (5)$$

When a remanent polarization value of the ferroelectric material for the ferroelectric layer 8 is $P_r$, a formula (6) is derived.

$$Q_r = P_r \cdot S_f \quad (6)$$

Therefore, from the formula (5) and the formula (6), a formula (7) has to be satisfied.

$$\epsilon_o \cdot \epsilon_{EPD} \cdot S_{EPD} \cdot V / d_{EPD} > P_r \cdot S_f \quad (7)$$

When an anti-voltage of the ferroelectric material for the ferroelectric layer 8 is $V_c$, a formula (8) has to be satisfied so as to reverse the polarity of the ferroelectric layer 8.

$$V_f > V_c \quad (8)$$

Moreover, a formula (9) is derived.

$$V_c = E_c \cdot d_f \quad (9)$$

Therefore, a formula (10) is derived from the formulas (4), (6), (8), and (9).

$$\epsilon_o \cdot \epsilon_{EPD} \cdot S_{EPD} \cdot V / d_{EPD} - P_r \cdot S_f > (\epsilon_o \cdot \epsilon_f \cdot S_f / d_f + \epsilon_o \cdot \epsilon_{EPD} \cdot S_{EPD} / d_{EPD}) \cdot E_c \cdot d_f \quad (10)$$

If the formula (10) is rearranged, a formula (A) is derived.

$$\epsilon_o \cdot \epsilon_{EPD} \cdot S_{EPD} \cdot V / d_{EPD} > P_r \cdot S_f + \epsilon_o \cdot \epsilon_f \cdot S_f \cdot E_c + \epsilon_o \cdot \epsilon_{EPD} \cdot S_{EPD} / d_{EPD} \cdot E_c \cdot d_f \quad (A)$$

As described above, the formula (7) and the formula (A) have to be satisfied under the first condition. However, if the formula (A) is satisfied, the formula (7) is also satisfied automatically. Therefore, it is enough that the formula (A) is satisfied resultingly.

Second Condition

When a voltage V applied to the electrophoretic capacitor 23 and the ferroelectric capacitor 24 becomes zero, a voltage $V_f$ having a polarity opposite to the voltage V is applied to the ferroelectric layer 8. If the voltage $V_f$ exceeds $-V_c$, the ferroelectric layer 8 is subjected to polarization reversal again. Therefore, the voltage $V_f$ should not exceed $-V_c$. Namely, a formula $V_f > -V_c$ has to be satisfied.

Therefore, if 0 is assigned to V in the formula (2), a formula (11) is derived.

$$Q_f = \epsilon_o \cdot \epsilon_{EPD} \cdot S_{EPD} V_f / d_{EPD} \quad (11)$$

From the formulas (11), (1), and (6), a formula (12) is derived.

$$Q_r + \epsilon_o \cdot \epsilon_f \cdot S_f \cdot V_f / d_f = -\epsilon_o \cdot \epsilon_{EPD} \cdot S_{EPD} \cdot V_f / d_{EPD} \quad (12)$$

Further, from the formulas (12) and (6), a formula (13) is derived.

$$P_r \cdot S_f = -(\epsilon_o \cdot \epsilon_f \cdot S_f / d_f + \epsilon_o \cdot \epsilon_{EPD} \cdot S_{EPD} / d_{EPD}) \cdot V_f \quad (13)$$

In addition, the formula $V_f > -V_c$ has to be satisfied as described above. From the formula $V_f > -V_c$ and the formula (9), a formula (B) is derived.

$$P_r \cdot S_f < \epsilon_o \cdot \epsilon_f \cdot S_f \cdot E_c + \epsilon_o \cdot \epsilon_{EPD} \cdot S_{EPD} / d_{EPD} \cdot E_c \cdot D_f \quad (B)$$

As described above, the formula (B) has to be satisfied under the second condition.

Therefore, a material having each material parameter (each of the dielectric constant, the anti-electric field, and the remanent polarization value) needs to be selected, an element size (an area and a thickness) needs to be designed, and a driving voltage needs to be selected for each of the ferroelectric layer 8 and the electrophoretic dispersion liquid layer 400 so as to satisfy the first and second conditions described above. Accordingly, if a current is supplied to the electrophoretic capacitor 23 and the ferroelectric capacitor 24 that are connected in series, the electrophoretic particles are electrophoresed to conduct a display and the ferroelectric layer 8 is subjected to the polarization reversal. Further, even after the current supply is stopped, the display can be retained due to the remanent polarization of the ferroelectric layer 8.

Namely, the electrophoretic display device 20 of the embodiment satisfies the formula (A) and the formula (B).

$$\epsilon_o \cdot \epsilon_{EPD} \cdot S_{EPD} \cdot V / d_{EPD} > P_r \cdot S_f + \epsilon_o \cdot \epsilon_f S_f E_c + \epsilon_o \cdot \epsilon_{EPD} \cdot S_{EPD} / d_{EPD} \cdot E_c \cdot d_f \quad (A)$$

$$P_r \cdot S_f < \epsilon_o \cdot \epsilon_f S_f E_c + \epsilon_o \cdot \epsilon_{EPD} \cdot S_{EPD} / d_{EPD} \cdot E_c \cdot d_f \quad (B)$$

Therefore, the electrophoretic display device 20 can securely retain a display even if the current supply is stopped (even if the switch 26 is switched off).

Third Condition

In order to prevent a breakdown of the ferroelectric layer 8, the following formula needs to be satisfied when a breakdown voltage of the ferroelectric layer 8 is $V_{BD}$ and a breakdown field of the ferroelectric layer 8 is $E_{BD}$.

$$V_f < V_{BD} = E_{BD} \cdot d_f$$

Therefore, from such the formula for preventing the breakdown, and the formulas (4), (6), and (9), a formula (C) is derived.

$$\epsilon_o \cdot \epsilon_{EPD} \cdot S_{EPD} \cdot V / d_{EPD} < P_r \cdot S_f + \epsilon_o \cdot \epsilon_f S_f E_c + \epsilon_o \cdot \epsilon_{EPD} \cdot S_{EPD} / d_{EPD} \cdot E_{BD} \cdot d_f \quad (C)$$

Thus, the electrophoretic display device 20 of the present embodiment satisfies the formula (C):

$$\epsilon_o \cdot \epsilon_{EPD} \cdot S_{EPD} \cdot V / d_{EPD} < P_r \cdot S_f + \epsilon_o \cdot \epsilon_f S_f E_c + \epsilon_o \cdot \epsilon_{EPD} \cdot S_{EPD} / d_{EPD} \cdot E_{BD} \cdot d_f$$ as the third condition.

Accordingly, the breakdown of the ferroelectric layer 8 is prevented so as to be able to enhance the reliability of the electrophoretic display device 20.

As described above, the electrophoretic display device 20 is formed with materials and sizes that satisfy the formulas (A), (B), and (C).

As a concrete example, the following conditions are set: a thickness $d_{EPD}$ of 30 [μm] and a relative dielectric constant $\epsilon_{EPD}$ of 60 in the electrophoretic capacitor 23; a relative dielectric constant $\epsilon_f$ of 12.5, a remanent polarization Pr of 8 [μC/cm²], an anti-electric field $E_c$ of 0.5 [MV/cm], a breakdown field $E_{BD}$ of 2 [MV/cm] in the ferroelectric capacitor 24 that is assumed to be made of P(VDF/TrFE) as a ferroelectric material; and the voltage V of 30[V] in the power source 25. Under the conditions, from the formulas (A), (B), and (C), a ratio between the area $S_f$ of the ferroelectric capacitor 24 and the area $S_{EPD}$ of the electrophoretic capacitor 23 and an effective range of the thickness $d_f$ of the ferroelectric layer 8 can be calculated, as shown in FIG. 6.

Therefore, in this case, parameters $S_f$, $S_{EPD}$, and $d_f$ with respect to shapes of the electrophoretic capacitor 23 and the ferroelectric capacitor 24 are set such that they are within a range shown by a shaded area in FIG. 6, in the electrophoretic display device 20.

Here, the relative dielectric constant $\epsilon_{EPD}$ of the electrophoretic dispersion liquid is related to a part with respect to a display mechanism in the electrophoretic dispersion liquid of the electrophoretic dispersion liquid layer 400. In addition, the relative dielectric constant $\epsilon_{EPD}$ varies in accordance with an on/off frequency of the electrophoretic capacitor 23 as shown in FIG. 5, so that a value of $\epsilon_{EPD}$ that is approximate to a frequency of the display mechanism is employed. Accordingly, the display property of the electrophoretic display device 20 can be improved.

Second Embodiment

An electrophoretic display device according to a second embodiment of the invention will be now described.

Figure 7:
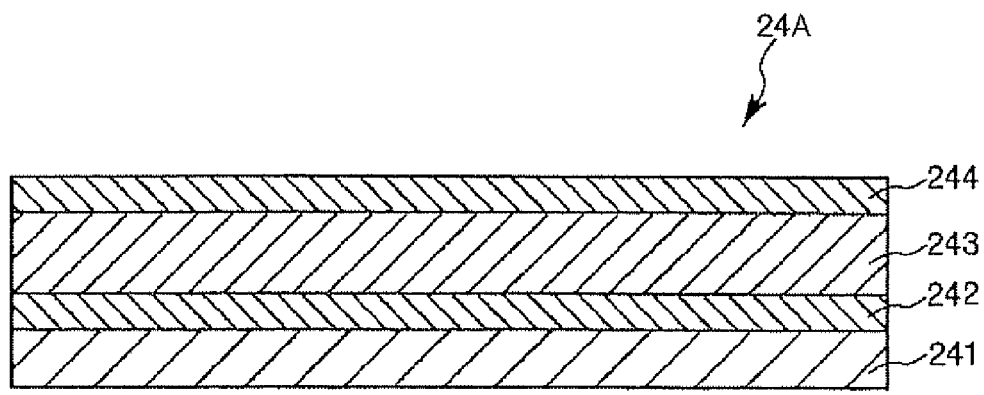
FIG. 7 is a longitudinal-sectional view schematically illustrating a ferroelectric capacitor provided to an electrophoretic display device according to a second embodiment of the invention.

FIG. 7 is a longitudinal-sectional view schematically illustrating a ferroelectric capacitor provided to the electrophoretic display device of the second embodiment of the invention. In the following description, the top side in FIG. 7 is described as "up", while the bottom side is described as "down" for simplifying the description.

The following description of the second embodiment of the electrophoretic display device focuses primarily on differences from the first embodiment, and similar points will be omitted.

The electrophoretic display device of the second embodiment includes an electrophoretic capacitor (not shown) having the same structure as that of the electrophoretic display device 20 of the first embodiment and a ferroelectric capacitor 24A connected with the electrophoretic capacitor in series.

In this ferroelectric capacitor 24A, an electrode 242, a ferroelectric layer 243, and an electrode 244 are layered on a substrate 241 from the bottom in this order, as shown in FIG. 7.

In the electrophoretic capacitor, which is not shown, in such the electrophoretic display device of the second embodiment, an electrophoretic dispersion liquid layer is interposed between a common electrode and a plurality of individual electrodes. The ferroelectric capacitor 24A includes a plurality of electrodes (an electrode-pair) 242 and 244 as separate bodies from the common electrode and each of the individual electrodes of the electrophoretic capacitor, and a ferroelectric layer 243 is interposed between the electrodes 242 and 244.

Since a shape and the like of the electrophoretic capacitor do not affect those of the ferroelectric capacitor 24A in the electrophoretic display device having such structure, a degree of freedom on designing the ferroelectric capacitor 24A can be enhanced.

<Electronic Apparatus>

The electrophoretic display device 20 described above can be incorporated in various electronic apparatuses. Such electronic apparatuses can securely retain a display even though a current supply is stopped, thereby having a high reliability. Electronic apparatuses of the invention equipped with the electrophoretic display device 20 will now be described.

<<Electronic Paper>>

First, an electronic paper to which the electronic apparatus of the invention is applied will be described.

Figure 8:
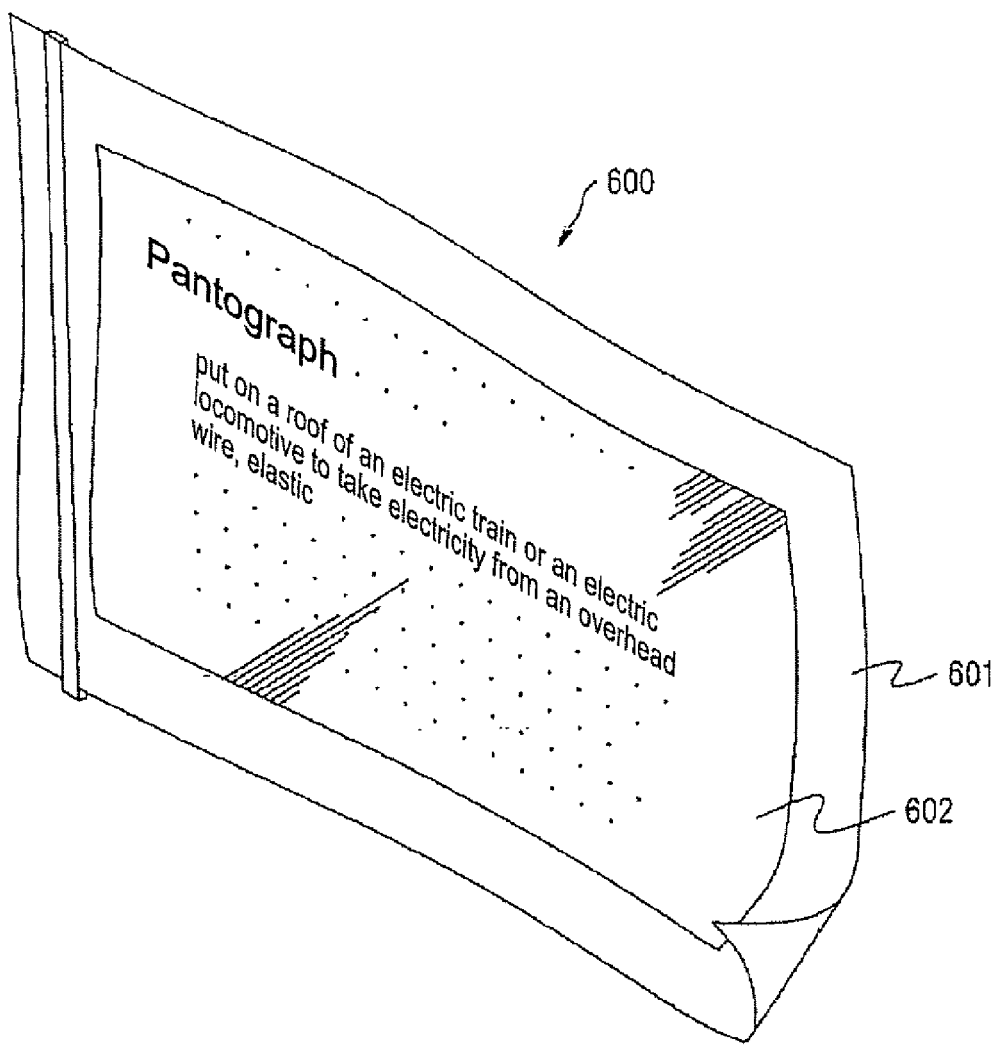
FIG. 8 is a perspective view showing an electronic paper to which an electronic apparatus according to the invention is applied.

FIG. 8 is a perspective view illustrating an electronic paper to which the electronic apparatus of the invention is applied.

An electronic paper 600 shown in FIG. 8 includes a main body 601 that is composed of a rewritable sheet having the same texture and flexibility as those of papers, and a display unit 602.

In the electronic paper 600, the display unit 602 includes the electrophoretic display device 20 described above.

<<Display>>

Next, a display to which the electronic apparatus of the invention is applied will be described.

Figure 9A:
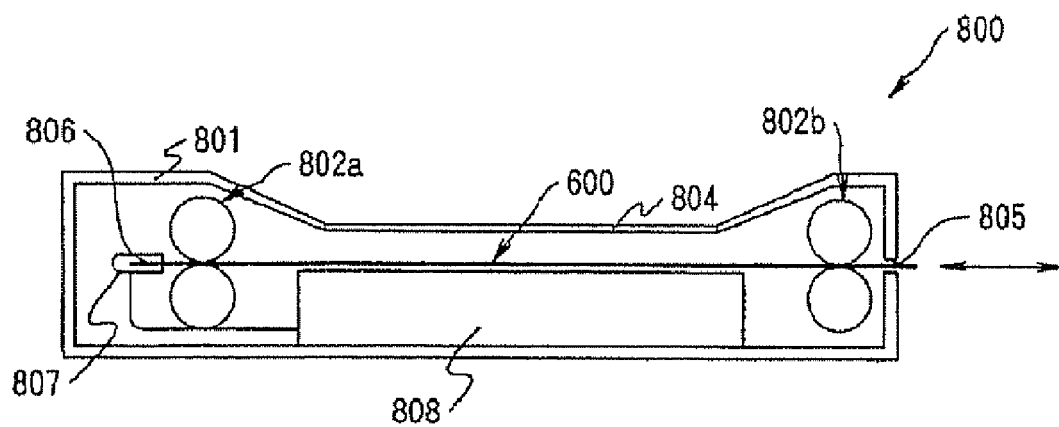
FIGS. 9A and 9B are respectively a sectional view and a plan view showing a display to which the electronic apparatus of the invention is applied.
Figure 9B:
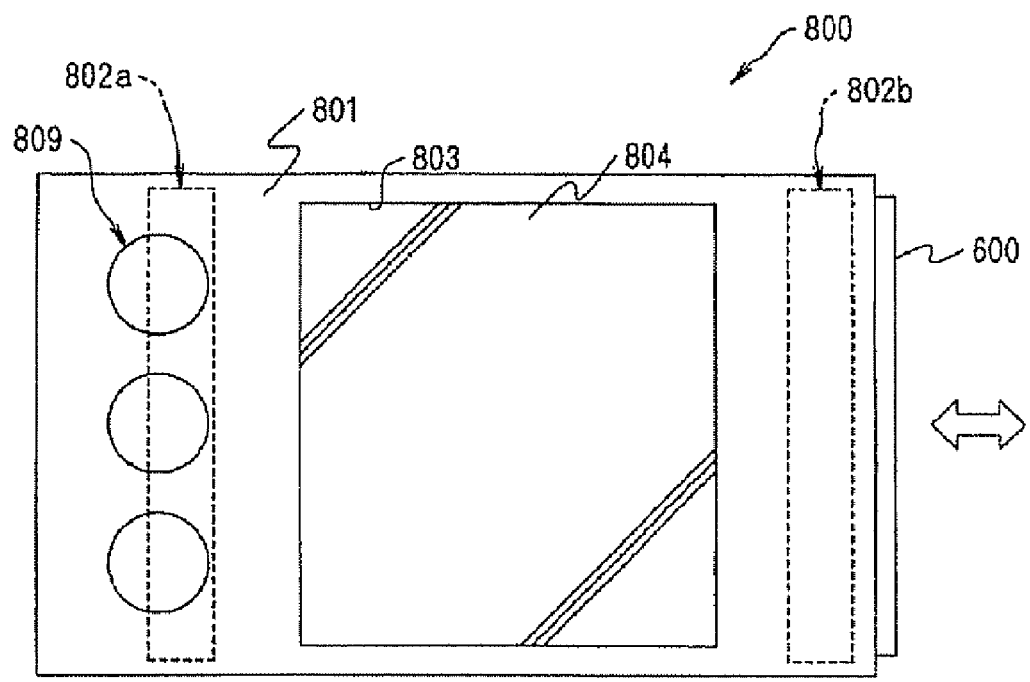

FIGS. 9A and 9B are diagrams illustrating a display to which the electronic apparatus of the invention is applied. FIG. 9A is a sectional view, and FIG. 9B is a plan view.

A display (a display device) 800 shown in FIGS. 9A and 9B includes a main body 801, and the electronic paper 600 that is removably provided to the main body 801. The electronic paper 600 has the same structure as the above, that is, the one shown in FIG. 8.

The main body 801 has an insertion slot 805, into which the electronic paper 600 can be inserted, on its side (right side in FIG. 9A). The body 801 also has two pairs of feed rollers 802a and 802b inside. When the electronic paper 600 is inserted through the insertion slot 805 into the body 801, the electronic paper 600 is fed to be set in the body 801 in a manner being sandwiched by the pairs of feed rollers 802a and 802b.

A rectangular opening 803 is formed on the display surface side (front side of FIG. 9B) of the main body 801, and a transparent glass plate 804 is embedded in the opening 803. Accordingly, the electronic paper 600 set in the body 801 can be seen from the outside of the body 801. In other words, the display 800 is provided with a display by making the electronic paper 600 set in the body 801 visible through the transparent glass plate 804.

Also, a terminal 806 is provided at the leading end of the electronic paper 600 (left side in FIG. 9A) in the inserting direction. Inside the main body 801, a socket 807 is provided. The socket 807 is coupled to the terminal 806 when the electronic paper 600 is fed into the main body 801. The socket 807 is electrically coupled to a controller 808 and an operating part 809.

The electronic paper 600 is detachably set in the body 801 of the display 800, so that the electronic paper 600 can be also used out of the body 801 for portable use.

In the display 800, the electronic paper 600 is composed of the electrophoretic display device 20 described above.

The electronic apparatus according to the invention is not limited to the above. Examples of the electronic apparatus include: TV sets, finder-view sets, direct-view video recorders, car navigation systems, pagers, electronic notebooks, calculators, electronic newspapers, word processors, personal computers, workstations, videophones, point-of-sale (POS) devices, and touch-sensitive panel devices. The electrophoretic display device 20 of the invention is applicable to a display of various types of electronic apparatuses like these.

The electrophoretic display device and the electronic apparatus have been described based on the embodiments illustrated in the figures. However, the application of the invention is not limited to those described above. The constituents of each part can be replaced with any other constituents having similar functions. In addition, other any structures can be added to the invention.

The electrophoretic display device of the invention may also be formed by combining arbitrary two or more structures (characteristics) of the above-mentioned embodiments.

In the embodiments described above, the structure in which a pair of electrodes is provided to face each other is described, but the invention is not limited to this. For example, a structure in which a pair of electrodes is provided on one substrate is also applicable.

Further, in the embodiments, a structure in which a pair of substrates is provided to face each other is described, but the invention is not limited to this. For example, a structure having a single substrate is also applicable.

The structure of the electrophoretic dispersion liquid is not limited to the above-mentioned embodiments as long as the electrophoretic dispersion liquid containing at least one electrophoretic particle is included.

In the embodiments, the microcapsules are located to straddle two adjacent pixel electrodes (electrodes), but the invention is not limited to this. For example, the microcapsules may be located to straddle three or more of adjacent pixel electrodes or located without straddling adjacent pixel electrodes. Alternatively, these arrangements may be mixed.

Further, the electrophoretic dispersion liquid layer may include no microcapsules.

What is claimed is:

1. An electrophoretic display device, comprising:
   an electrophoretic capacitor provided with an electrophoretic layer containing at least one kind of electrophoretic particle; and
   a ferroelectric capacitor provided with a ferroelectric layer containing a ferroelectric material,
   wherein the electrophoretic particle is allowed to move to conduct a display and thus a polarity of the ferroelectric layer is inverted by a current supply to the electrophoretic capacitor and the ferroelectric capacitor that are electrically connected with each other, and the display can be retained due to a remanent polarization of the ferroelectric layer even after the current supply is stopped; and
   wherein a formula (A) and a formula (B) are satisfied when a voltage to be applied to the ferroelectric capacitor is $V_f$, a charge stored in the ferroelectric capacitor when the voltage $V_f$ is applied to the ferroelectric capacitor is $Q_f$, a relative dielectric constant of the ferroelectric material is $\epsilon_f$, an area of the ferroelectric layer in a planar view is $S_f$, a thickness of the ferroelectric layer is $d_f$, a relative dielectric constant of the electrophoretic layer is $\epsilon_{EPD}$, an area of the electrophoretic layer in a planar view is $S_{EPD}$, and a thickness of the electrophoretic layer is $d_{EPD}$:

$$\epsilon_o \cdot \epsilon_{EPD} \cdot S_{EPD} \cdot V/d_{EPD} > P_r \cdot S_f + \epsilon_o \cdot \epsilon_f \cdot S_f \cdot E_c + \epsilon_o \cdot \epsilon_{EPD} \cdot S_{EPD}/d_{EPD} \cdot E_c \cdot d_f \quad (A),$$

$$P_r \cdot S_f < \epsilon_o \cdot \epsilon_f \cdot S_f \cdot E_c + \epsilon_o \cdot \epsilon_{EPD} \cdot S_{EPD}/d_{EPD} \cdot E_c \cdot d_f \quad (B).$$

2. The electrophoretic display device according to claim 1, wherein a formula (C) is satisfied when a breakdown field of the ferroelectric layer is $E_{BD}$:

$$\epsilon_o \cdot \epsilon_{EPD} \cdot S_{EPD} \cdot V/d_{EPD} < P_r \cdot S_f + \epsilon_o \cdot \epsilon_f \cdot S_f \cdot E_c + \epsilon_o \cdot \epsilon_{EPD} \cdot S_{EPD}/d_{EPD} \cdot E_{DB} \cdot d_f \quad (C).$$

3. The electrophoretic display device according to claim 1, wherein the ferroelectric material contains at least one of vinylidene fluoride-trifluoroethylene copolymer and vinylidene fluoride polymer.

4. The electrophoretic display device according to claim 1, further comprising:
   a common electrode; and
   a plurality of individual electrodes opposed to the common electrode, wherein
   the electrophoretic layer is interposed between the common electrode and each of the individual electrodes, and the ferroelectric layer is interposed between the individual electrodes and the electrophoretic layer.

5. The electrophoretic display device according to claim 1, wherein the electrophoretic capacitor includes a common electrode and a plurality of individual electrodes opposed to the common electrode; the electrophoretic layer is interposed between the common electrode and each of the individual electrodes; the ferroelectric capacitor includes a plurality of electrode pairs provided as separate bodies from the common electrode and the individual electrodes in a manner corresponding to each of the individual electrodes; and the ferroelectric layer is interposed between the electrode pairs.

6. An electronic apparatus, comprising:
an electrophoretic display device including:
an electrophoretic capacitor provided with an electrophoretic layer containing at least one kind of electrophoretic particle; and
a ferroelectric capacitor provided with a ferroelectric layer containing a ferroelectric material,
in which the electrophoretic particle is allowed to move to conduct a display and thus a polarity of the ferroelectric layer is inverted by a current supply to the electrophoretic capacitor and the ferroelectric capacitor that are electrically connected with each other, and the display can be retained due to a remanent polarization of the ferroelectric layer even after the current supply is stopped; and in which a formula (A) and a formula (B) are satisfied when a voltage to be applied to the ferroelectric capacitor is $V_f$, a charge stored in the ferroelectric capacitor when the voltage $V_f$ is applied to the ferroelectric capacitor is $Q_f$, a relative dielectric constant of the ferroelectric material is $\in_f$, an area of the ferroelectric layer in a planar view is $S_f$, a thickness of the ferroelectric layer is $d_f$, a relative dielectric constant of the electrophoretic layer is $\in_{EPD}$, an area of the electrophoretic layer in a planar view is $S_{EPD}$, and a thickness of the electrophoretic layer is $d_{EPD}$:

$$\in_o \cdot \in_{EPD} \cdot S_{EPD} \cdot V/d_{EPD} > P_r \cdot S_f + \in_o \cdot \in_f \cdot S_f E_c + \in_o \cdot \in_{EPD} \cdot S_{EPD}/d_{EPD} \cdot E_c \cdot d_f \quad \text{(A)},$$

$$P_r \cdot S_f < \in_o \cdot \in_f \cdot S_f E_c + \in_o \cdot \in_{EPD} \cdot S_{EPD}/d_{EPD} \cdot E_c \cdot d_f \quad \text{(B)}.$$

* * * * *